United States Patent
Cagle, Jr.

[15] 3,665,913
[45] May 30, 1972

[54] PORTABLE COOKING GRILL

[72] Inventor: Bunyam B. Cagle, Jr., 5711 Grand Ave., Fort Smith, Ark. 72901

[22] Filed: Dec. 30, 1970

[21] Appl. No.: 102,684

[52] U.S. Cl. .................................... 126/25 R, 126/25 A
[51] Int. Cl. ........................... A47j 37/00, F24b 3/00
[58] Field of Search ................... 126/25 R, 25 A, 9 R

[56] References Cited

UNITED STATES PATENTS

| 2,608,190 | 8/1952 | Winning et al. | 126/25 A |
| 2,666,426 | 1/1954 | Pollard | 126/25 R |
| 2,792,773 | 5/1957 | Barker | 126/25 A X |
| 3,343,527 | 9/1967 | Manteris | 126/25 R |
| 3,583,385 | 6/1971 | Beller | 126/25 A |

Primary Examiner—Charles J. Myhre
Attorney—Albert H. Kirchner

[57] ABSTRACT

A portable charcoal cooking grill comprising a generally half-cylindrical open-topped firebox is surmounted by a generally half-cylindrical cover which is rotatable on the firebox axially to adjusted degrees of opening settable by cam means cooperating between the firebox and cover so as to regulate the rate of air supply to burning fuel beneath a grate which is similarly cam-supported and vertically adjustable in the firebox.

13 Claims, 5 Drawing Figures

Patented May 30, 1972  3,665,913

INVENTOR
BUNYAN B. CAGLE, JR.

BY *Albert H. Kirchner*
ATTORNEY

Patented May 30, 1972

INVENTOR
BUNYAN B. CAGLE, JR.

BY *Albert H. Kirchner*

ATTORNEY

3,665,913

PORTABLE COOKING GRILL

BACKGROUND OF THE INVENTION

This invention relates generally to portable cooking grills of the type extensively used with charcoal and similar briquette or lump fuel in the broiling of steaks, hamburgers, frankfurters and the like. Such grills are provided by the prior art in many different designs and embodiments, all comprising essentially a firebox for containing a bed of burning fuel, surmounted by a grate for holding the food to be cooked, and sometimes including a hood or cover that can be closed during the cooking operation to modify the rate of combustion, the application of heat to the material on the grate, the generation and disposition of smoke, and for other reasons and purposes to suit the preferences of the cook.

In some cases the grate has been mounted for vertical adjustment relative to the burning fuel so as to vary the degree of exposure of the food to heat from the fire.

SUMMARY OF THE INVENTION

The present invention provides a cooking grill of the general type indicated embodying a new relationship of firebox and cover by which the grate can be exposed in varying degrees to admission of air and can be fixed through a wide range of adjustment by simple means located entirely outside the firebox. The range is between fully closed and maximum open, and the adjustment means securely holds the selected position.

The invention also includes, in a preferred full embodiment of the inventive principles, a mounting for the grate in the firebox by which the grate can be elevated through a range of horizontal positions, closer to or farther from the firebed, and can be tilted if desired, i.e., raised to an angular position higher or lower in the front or in the back, so that food material disposed on different areas of the grate can be subjected simultaneously to greater or less heat, for faster or slower or more or less thorough cooking.

Other features of the invention include means for mounting the structure on legs of its own or on a table or other horizontal surface, handles for operating the cover and the grate through their ranges of adjustment, and other details that will be apparent from the description hereinafter of a preferred embodiment of the invention.

SHORT DESCRIPTION OF THE DRAWINGS

In the accompanying drawings, which form part of this application for letters patent and which depict the invention in a certain preferred form of embodiment which has been reduced to practice and manufactured commercially and found to give entirely satisfactory results, and which accordingly is at present preferred, FIG. 1 is a perspective view of a grill constructed in accordance with the principles of the invention, with a portion of the cover broken away to show a feature of the preferred mounting for the grate;

DESCRIPTION OF THE PREFERRED EMBODIMENT

Figure 1:
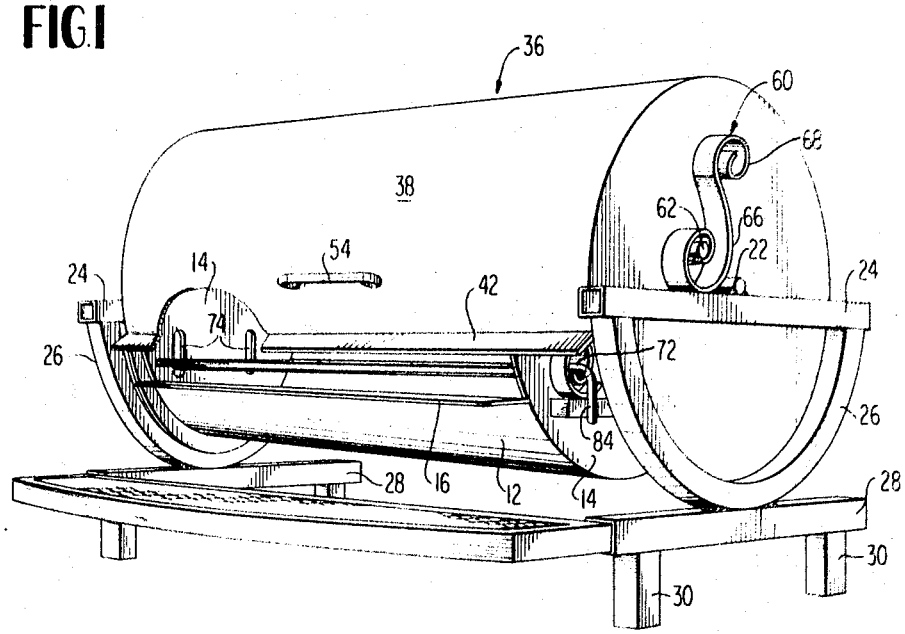

In the embodiment of the invention presently preferred and shown in the drawings, the structure includes a firebox 10, of generally half-cylindrical shape formed by a cylindrically curved longitudinal wall 12 connecting fully circular end walls 14, all made from heavy gauge black sheet iron or equivalent material. The wall 12 terminates in a front edge which is bent outwardly to provide a forwardly projecting lip or flange 16 somewhat below the horizontal axial plane of the cylinder, and terminates some 180° around the cylinder in a rear edge 18. The firebox thus constitutes a trough which is open at its top, much of its front, and the upper portion of its back. As will later appear, the trough contains a grate, and the inside bottom of the trough, below the grate, is adapted to contain fuel, such as charcoal lumps or briquettes, to provide a firebed.

The firebox is mounted in fixed horizontal position, preferably by such means as the stout rods 20, 22 which are welded to the end walls 14 and project axially therefrom and in turn are welded to some supporting means such as the cross bearers 24, 24. These cross bearers are mounted on a stand of any suitable type, such, for example, as the one suggested in the drawing. As there shown, the stand is made up of a pair of semi-circular end brackets 26 which in turn are welded to lower cross bearers 28 forming a sort of skeletonized table top supported on legs 30.

The firebox (and its cooperating parts hereinafter to be described) can of course be made for mounting independently of the table. In that case the legs 30 are omitted and the cross bearers 28 form the bottom that in use of the device is set on a table or the equivalent horizontal surface.

Figure 2:
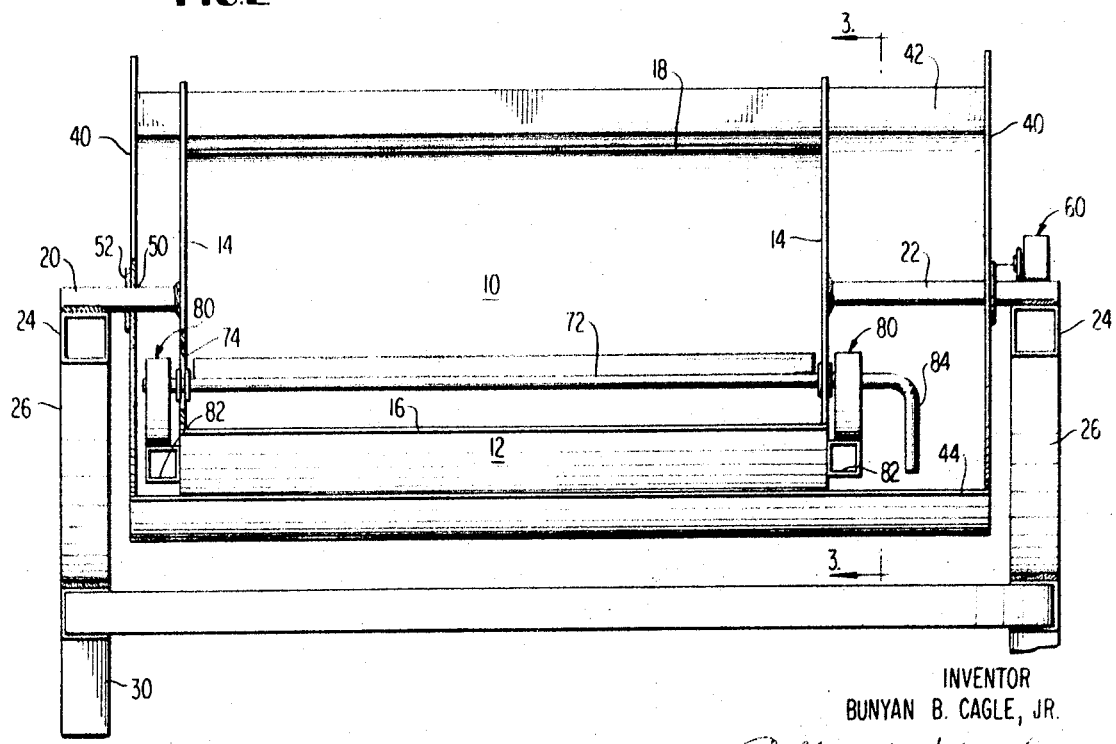
FIG. 2 is a front elevational view showing the cover retracted to fully open position, with a portion at the left side of the figure depicted in section to show the journaling of the cover on the firebox and the vertically adjustable mounting of the grate in the firebox.

The firebox is provided with a hood or cover, designated generally 36. This comprises a generally half-cylindrical member formed by a cylindrically curved wall 38 connected opposed end walls 40, 40, which, like the firebox end walls 14, 14, are fully circular. The parts 38, 40, 40 are made of the same metal stock as the corresponding parts 12, 14, 14 of the firebox. The curved wall 38 of the cover terminates at its normally lower, front edge in a forwardly projecting lip or flange 42, and at its rear in a back, unflanged edge 44 substantially 180° removed from the flange 42. The effect is a cover or housing substantially like the firebox in shape, being open through approximately one-half of its cylindrical shape. The cover, however, differs from the firebox in size, as is best shown by FIg. 2, being sufficiently larger, in both axiam and radial dimensions, to encompass the firebox when it is mounted on the firebox, as shown in FIG. 2, and to enclose certain other elements of the device, as will be explained.

This mounting is effected by providing each of the cover end walls 40 with an axial opening 50 for journaling on one of the rods 20, 22 that project from the firebox end walls 14. As shown in FIG. 2, the openings 50 may be reinforced and the journaling improved by surrounding them with bearings in the form of heavy washers 25 which are welded to the cover end walls 40.

Figure 3:
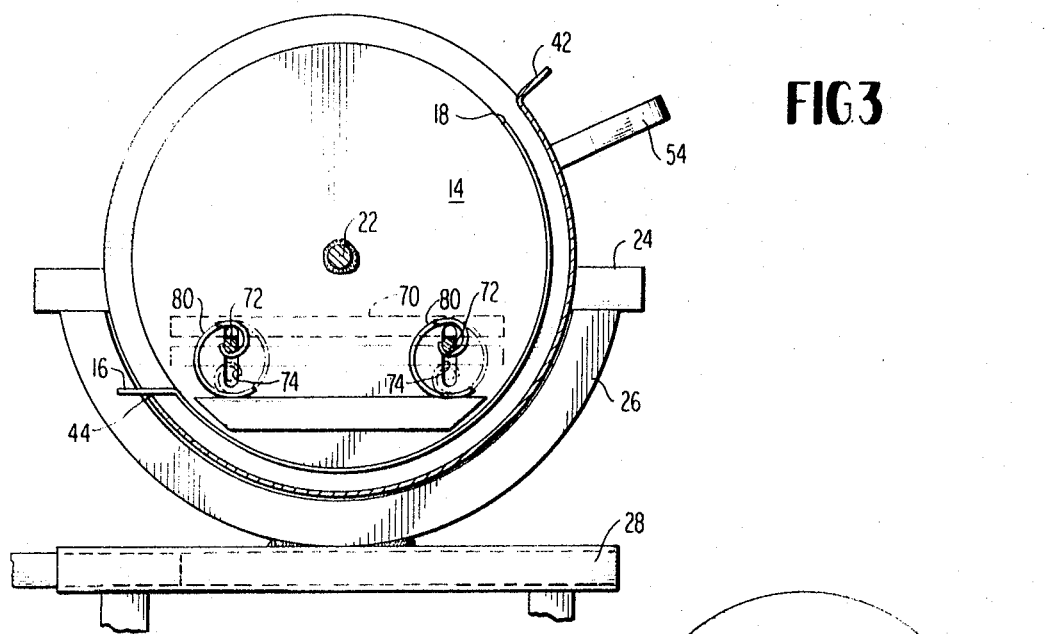
FIg. 3 is a transverse cross sectional view taken on the line 3—3 of FIG. 2.
Figure 4:
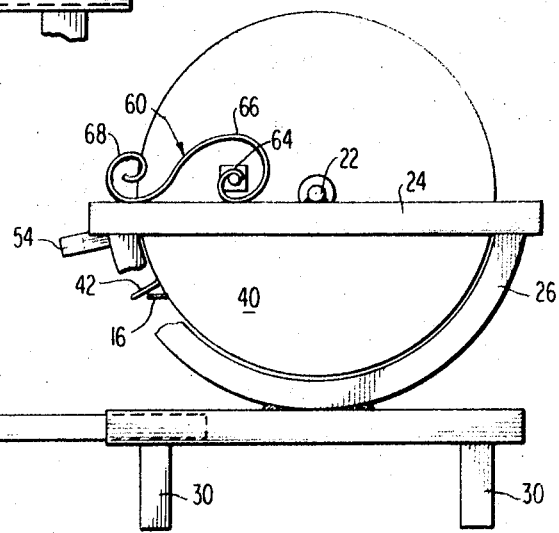
FIG. 4 is an end elevational view showing the cover in fully closed position.

The cover 36 is thus mounted on the firebox for rotation about the rods 20, 22 between the fully closed position shown in FIG. 4, in which the cover edge flange 42 contacts the firebox flange 16, and the fully open position shown in FIG. 3, in which the other, rear edge 44 of the cover engages the firebox flange 16 and thereby stops further rotation of the cover. A handle 54 may be provided on the cover to facilitate its being opened and closed.

Figure 5:
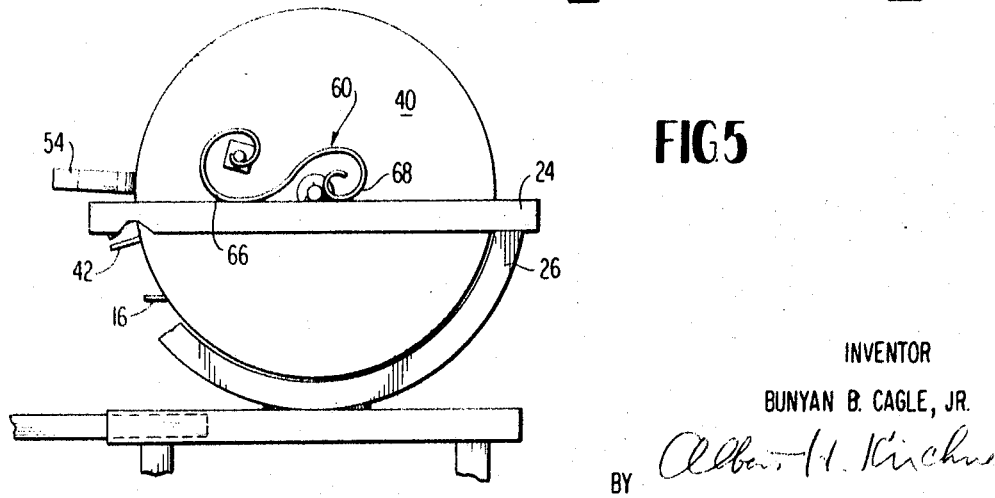
FIG. 5 is a similar end elevational view showing the cover in partially open position.

As has been stated hereinabove, it is often desirable to set the cover only partially open, i.e., adjusted to some position between the fully open and fully closed positions of FIGS. 3 and 4, for such purposes as regulating the rate of combustion, or varying the amount of smoke produced or directed onto the cooking food, or otherwise. In accordance with the invention, this is accomplished by the camming device designated generally 60, which comprises a stiff strip of metal bent into the scroll shape shown in FIGS. 1, 4 and 5. The strip has welded to one of its ends a pivot pin 62, which is rotatable in a small bracket 64 formed on the outer surface of one of the cover end walls 40, and from this pivoted end the strip extends in a curvature portion 66 of increasing radius to a handle portion 68 at its other, or free, end. The location of the device is adjacent to the proximate cross bearer 24 of the firebox, so that the portion 66 bears on the cross bearer in the manner of a cam on its follower. It will be obvious, therefore, that when the handle portion 68 is manipulated to turning the camming device eccentrically about the pivot 62, the throw on the cross bearer 24 will function to adjust the cover through a range of difficult degrees of opening, —from the minimal opening or fully closed position of FIG. 4, where the curvature of smallest radius of the camming device bears on the cross bearer, to the position of greater opening shown in FIG. 5, where the curvature 66 of greatest radius of the device bears on the cross bearer.

Within the firebox 10 is mounted a grate 70. This may be of conventional type, consisting of a flat, slotted cast iron plate of rectangular shape in plane. For mounting the grate in position properly in the firebox, at a desired spacing above the burning fuel in the trough that forms the bottom of the firebox, and for rendering this spacing readily adjustable, so as to elevate or lower the grate by a translatory movement maintaining it horizontal, or if desired so as to tilt it by raising or lowering the grate front area more or less than its rear area, a camming or eccentric arrangement somewhat similar to that heretofore designated for adjusting the cover opening is provided.

This comprises a pair of longitudinally extending rods 72 which project in spaced parallelism through short vertical slots 74 spaced laterally apart at the same level in the two opposite end walls 14, 14 of the firebox. The bottom of the grate 70 is notched so as to rest on these rods, being readily removable therefrom for cleaning. Vertical adjustment of the rods, and hence of the grate, is provided by camming devices 80, four in number, one fixed to each end of each rod projecting beyond the adjacent firebox end wall 14. The devices 80 are all identical, each consisting of a scroll-shaped stiff metal strip having one end welded to the rod and extending from that end as an expanding curve of increasing radius which bears on the flat upper surface of a horizontal cross member 82 welded to the outer surface of the adjacent firebox end wall 14. It will be noted in FIG. 2 that the axial spacing between the adjacent end walls 14 of the firebox and 40 of the cover is sufficient to accommodate these camming devices 80. It will also be seen that this spacing is greater at the right hand end of the grill than at the left, the mounting rod 22 being longer then the mounting rod 20. This is to provide sufficient room at this end to accommodate a handle extension 84 for each of the rods 72 and to admit the hand of a person using the device when it is desired to adjust the elevation, or the tilt, of the grate. It will be evident that when either of these handles is turned, its rod turns in its notches in the grate and its cam 80 turns in its thrust on the bearer 82 to lift or lower the rod in its slot 74 and hence alter the elevation of that portion of the grate, so that when both handles are turned equally the grate will be adjusted to a new elevation while being maintained horizontal, while if the handles are turned unequally the grate will be tilted.

Thus the cooking effect can be varied equally for all areas of the grate, or it can be increased or decreased relatively in the back and front areas.

While specific materials form no part of the present invention, it has been found convenient to form the firebox and the cover of relatively heavy gauge black sheet iron, the cross bearers of tubular iron or steel, the members 20, 22, 72 of stout rod stock, and the camming devices 60, 80, from heavy, stiff strap iron.

Details of the embodiment selected to illustrate the invention in this application for letters patent may be varied within the spirit of the invention and the scope of the appended claims.

I claim:

1. A cooking grill comprising
    an elongated firebox adapted to contain a bed of burning solid fuel such as charcoal and having an open top and opposed end walls,
    a grate within the firebox,
    a firebox cover member having a top wall covering the open top of the firebox and opposed end walls disposed beyond the firebox end walls,
    means mounting the cover member on the firebox for rotation between a closed position substantially fully covering the grate and any of a plurality of open positions partially uncovering the grate,
    and means for adjustably holding the cover member in selected open positions comprising
    an abutment element having an upwardly facing surface fixed relatively to one of the firebox end walls,
    and cam means eccentrically rotatably mounted on the cover member end wall adjacent to said last named firebox end wall and bearing on said abutment element surface.

2. A cooking grill as claimed in claim 1,
    in which the firebox and the cover member are each substantially half-cylindrical.

3. A cooking grill as claimed in claim 1,
    in which the cover member is biased for rotation to fully closed position.

4. A cooking grill as claimed in claim 1,
    in which the firebox and the cover member are each substantially half-cylindrical.
    and the cover member is unbalanced, being weighted in its front portion so as to be biased for rotation to fully closed position and requiring bearing of the cam means on the abutment element surface to hold it in open position.

5. A cooking grill as claimed in claim 1,
    in which the abutment element is a horizontal bar fixed to one end wall of the firebox
    and the cam means is a scroll having one end portion journaled on the adjacent end wall of the cover member and terminating at its other end in a handle portion.

6. A cooking grill as claimed in claim 1,
    in which the firebox and the cover member are each substantially half-cylindrical,
    the cover member is biased for rotation to fully closed position,
    and the firebox and the cover member are each formed with horizontal surface edge portions along the front of the grill adapted to be in mutual engagement when the cover member is in fully closed position and thus prevent further rotation of the cover member in closing direction.

7. A cooking grill as claimed in claim 1,
    in which the grate is mounted for vertically adjusted positions at selected different elevations in the firebox, 8. A cooking grill as claimed in claim 1,
    in which the grate is mounted for tilted adjustment at selected different elevations of its front and rear portions in the firebox.

9. A cooking grill as claimed in claim 1,
    including means presenting an upwardly facing surface outside the firebox and fixed relatively thereto,
    and means supporting the grate for vertical movement within the firebox
    including cam means engaging said last named surface
    whereby rotation of said cam means adjustably sets the elevation of the grate in the firebox.

10. A cooking grill as claimed in claim 9,
    in which the firebox end walls are vertically slotted,
    the grate is supported on rod means movable vertically in said slots and extending therethrough,
    and the cam means is mounted on the end of the rod means.

11. A cooking grill as claimed in claim 10,
    in which the rod means comprises a pair of rods each independently movable in its own slot in the firebox end wall
    for independently elevating the front and rear portions of the grate
    so as to tilt the grate.

12. A cooking grill comprising
    an elongated firebox adapted to contain a bed of burning fuel such as charcoal and having an open top,
    opposed end walls for the firebox each having a pair of vertical slots therein, a pair of rods positioned in spaced parallelism longitudinally in the firebox, each having its end portions extending through a pair of opposed slots in said end walls for vertical movement therein, a grate within the firebox mounted on said rods, and cam means cooperating with the rods and the firebox and walls for vertically moving the rods and thereby adjusting the elevation of the grate in the firebox.

13. A cooking grill as claimed in claim 12, in which the cam means comprises an eccentric formed on an end portion of each rod and rotatable with the rod and an abutment provided on the outer surface of the adjacent end wall of the firebox having an upper surface bearing the eccentric.

* * * * *